US007853892B2

(12) United States Patent  (10) Patent No.: US 7,853,892 B2
Liu  (45) Date of Patent: Dec. 14, 2010

(54) METHOD FOR DISPLAYING A RESIZED WINDOW

(76) Inventor: Ming-Te Liu, 8F-5, No. 43, Lane 174, Sec. 3, Chenggong Rd., Neihu Dist., Taipei City (TW)

( * ) Notice: Subject to any disclaimer, the term of this patent is extended or adjusted under 35 U.S.C. 154(b) by 121 days.

(21) Appl. No.: 11/425,124

(22) Filed: Jun. 19, 2006

(65) Prior Publication Data

US 2006/0288305 A1 Dec. 21, 2006

(30) Foreign Application Priority Data

Jun. 20, 2005 (TW) .............................. 94120451 A

(51) Int. Cl.
 *G06F 3/048* (2006.01)
(52) U.S. Cl. ..................... 715/798; 715/800; 715/781
(58) Field of Classification Search ................. 715/781, 715/800, 798
See application file for complete search history.

(56) References Cited

U.S. PATENT DOCUMENTS 5,751,283 A   5/1998  Smith
5,815,151 A * 9/1998  Argiolas .................... 715/800
6,396,487 B1 * 5/2002  Jameson .................... 715/788
6,396,520 B1 * 5/2002  Ording ...................... 715/798
6,501,487 B1 * 12/2002 Taguchi .................... 715/788
2002/0191026 A1  12/2002 Rodden
2007/0136684 A1 * 6/2007  Morrow et al. ............. 715/798

FOREIGN PATENT DOCUMENTS

TW  338818   8/1998
TW  I226014  1/2005

OTHER PUBLICATIONS

Screendumps (Resizing Window feature of Windows XP Professional Ver 5.1; 2001; pp. 1-4).*

* cited by examiner

*Primary Examiner*—Dennis-Doon Chow
*Assistant Examiner*—Rashawn Tillery
(74) *Attorney, Agent, or Firm*—Perkins Coie LLP

(57) ABSTRACT

A method for displaying a resized window includes receiving a resizing message, generating a window having a second size according to the resizing message and a window having a first size and located at a position corresponding to a first reference point, and displaying the window having the second size at a position different from the position corresponding to the first reference point. After generating the windows, the window having the second size is not displayed at the position corresponding to the first reference point.

14 Claims, 7 Drawing Sheets

METHOD FOR DISPLAYING A RESIZED WINDOW

BACKGROUND OF THE INVENTION

1. Field of the Invention

The present invention relates to a method for displaying a resized window, and more particularly, to a method which can prevent window flicker when displaying a resized window.

2. Description of the Prior Art

For window scaling, some operating systems take one point of the window as a reference point to draw the scaled window. Suppose that the operating system takes the top-left point as the reference point. If a user scales the window by expanding the top or left side, it is obvious that the window and the content of such would flicker. In this case, the operating system draws the scaled window based on the reference point (the top-left point of the original window), and then moves the top-right point of the scaled window to the top-right point of the original window, so that window scaling is achieved. However, when moving the scaled window, window flicker occurs. This phenomenon is more pronounced when scaling a window containing video.

Please refer to FIGS. 1 and 2. FIG. 1 is a diagram of moving a first window 10 according to the prior art. FIG. 2 is a diagram of scaling the first window 10 to become a second window 12 according to the prior art. The first window 10 has a first size, and is located at a position corresponding to a first reference point (the top-left point) P1 before being moved or scaled. As shown in FIG. 1, when the first window 10 is moved, the first window 10 is re-drawn at a new position (shown in dashed line), remaining at the same window size. In FIG. 2, the first window 10 is scaled to become a second window 12 having a second size (shown in dashed line). The second window 12 (shown in dashed line) is drawn according the first reference point P1. Then, the top-right point of the dashed line area is moved to the top-right point of the first window 10, taken as a second reference point P2, so that the scaling process is achieved (as shown by the second window 12 (in solid line. Please refer to FIG. 3, which is a flowchart of adjusting the first window according to the prior art.

Step 100: Start.

Step 102: A message queue receives a message (first message).

Step 104: Determine whether the message includes a request for adjusting the first window 10. If so, step 106 is entered. Otherwise, step 124 is entered.

Step 106: The information for an adjustment of the first window 10 is obtained from the message.

Step 108: Determine whether the information obtained from step 106 includes a command for scaling the first window 10. If so, step 114 is entered; otherwise, step 110 is entered.

Step 110: A new position of the first window 10 is obtained according to the information obtained in step 106.

Step 112: As shown in FIG. 1, the first window 10 is re-drawn at the new position so that the first window 10 is moved from the original position to the new position, and then step 124 is entered.

Step 114: As shown in FIG. 2, the first window 10 having the first size is scaled to become the second window 12 having the second size according to the information obtained in step 106.

Step 116: As shown by the dashed line area of FIG. 2, the second window 12 having the second size is drawn at the position corresponding to the first reference point P1.

Step 118: The message queue receives a next message (a second message).

Step 120: The information for the adjustment of the first window 10 is obtained from the next message received in step 118.

Step 122: As shown in FIG. 2, the second window 12 having the second size is displayed at the position corresponding to the second reference point P2 according to the information of step 120, such that the second window 12 is moved from the position corresponding to the first reference point P1 (the dashed line area) to the position corresponding to the second reference point P2.

Step 124: End.

From the above steps, when the user wants to move the window but not to scale it, the operating system processes the window movement using a message. However, when the user wants to scale the window, the operating system processes the scaling using two messages instead. That is, when the user only moves the window, the operating system obtains the new position where the first window is moved to according the information of step 106, and draws the first window 10 at the new position, accomplishing the movement. Nevertheless, when the user wants to scale the window in steps 114 and 116, the first window 10 having the first size is scaled to become the second window 12 having the second size, and the second window 12 is drawn according to the first reference point P1. In other words, if scaling the first window 10 by expanding the left side, the second window 12 is drawn in the dashed line area in FIG. 2 (the position corresponding to the first reference point P1). Then, as mentioned in steps 118 and 122, the second window 12 is displayed at the position corresponding to the second reference point P2 according to a second received message, such that the second window 12 is moved from the dashed line area (the position corresponding to the first reference point P1) to the position corresponding to the second reference point P2. In short, when the user wants to scale the window, the resized window (the second window 12) is displayed at the original position (the position corresponding to the first reference point P1), and then moved to the new position (the position corresponding to the second reference point P2). Therefore, when expanding the left side of the window, the window is expanded rightward and then moved leftward. Or, when expanding the top of the window, the window is expanded downward and then moved upward. These result in window flicker, especially when scaling a window contacting video playback.

SUMMARY OF THE INVENTION

It is therefore a primary objective of the claimed invention to provide a method of preventing window flicker when displaying a resized window to solve the above-mentioned problem.

The claimed invention discloses a method for displaying a resized window comprising receiving a first message, generating a window having a second size according to the first message and a window having a first size located at a position corresponding to a first reference point, and displaying the window having the second size at a position different from the position corresponding to the first reference point according to the first message. After step (b), the window having the second size is not displayed at the position corresponding to the first reference point.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
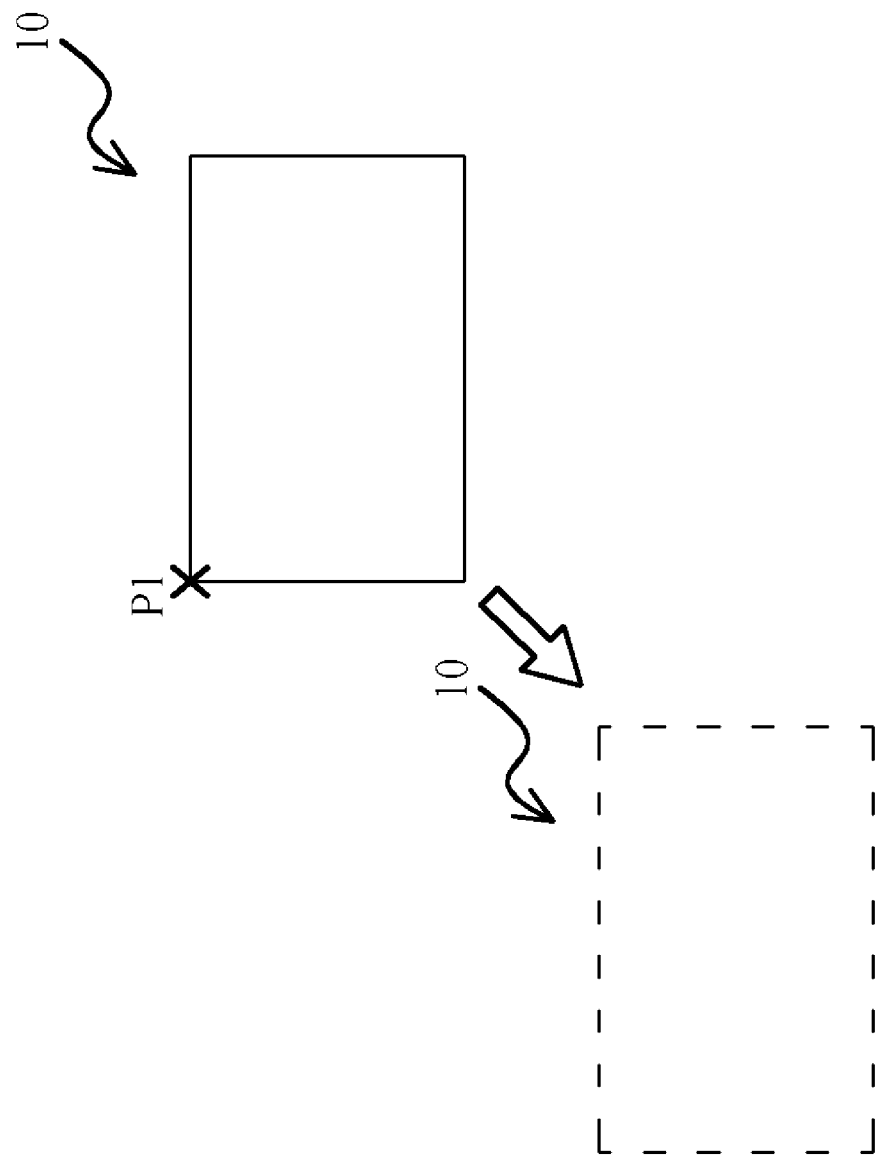
FIG. 1 is a diagram of moving a first window according to the prior art.
Figure 2:
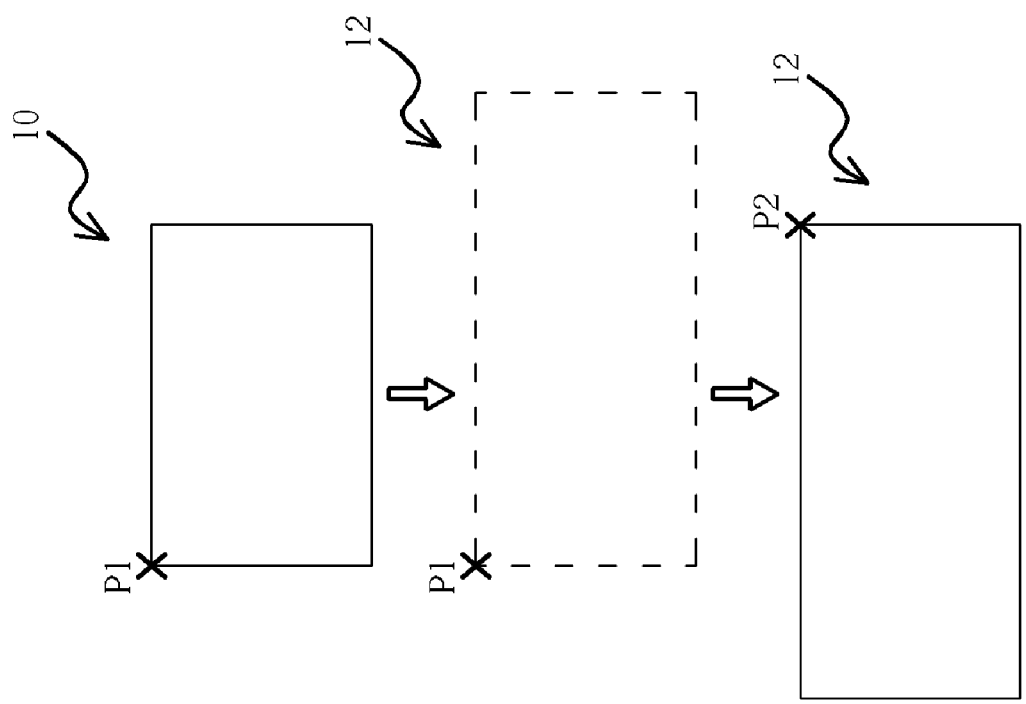
FIG. 2 is a diagram of scaling the first window to become a second window according to the prior art.
Figure 3:
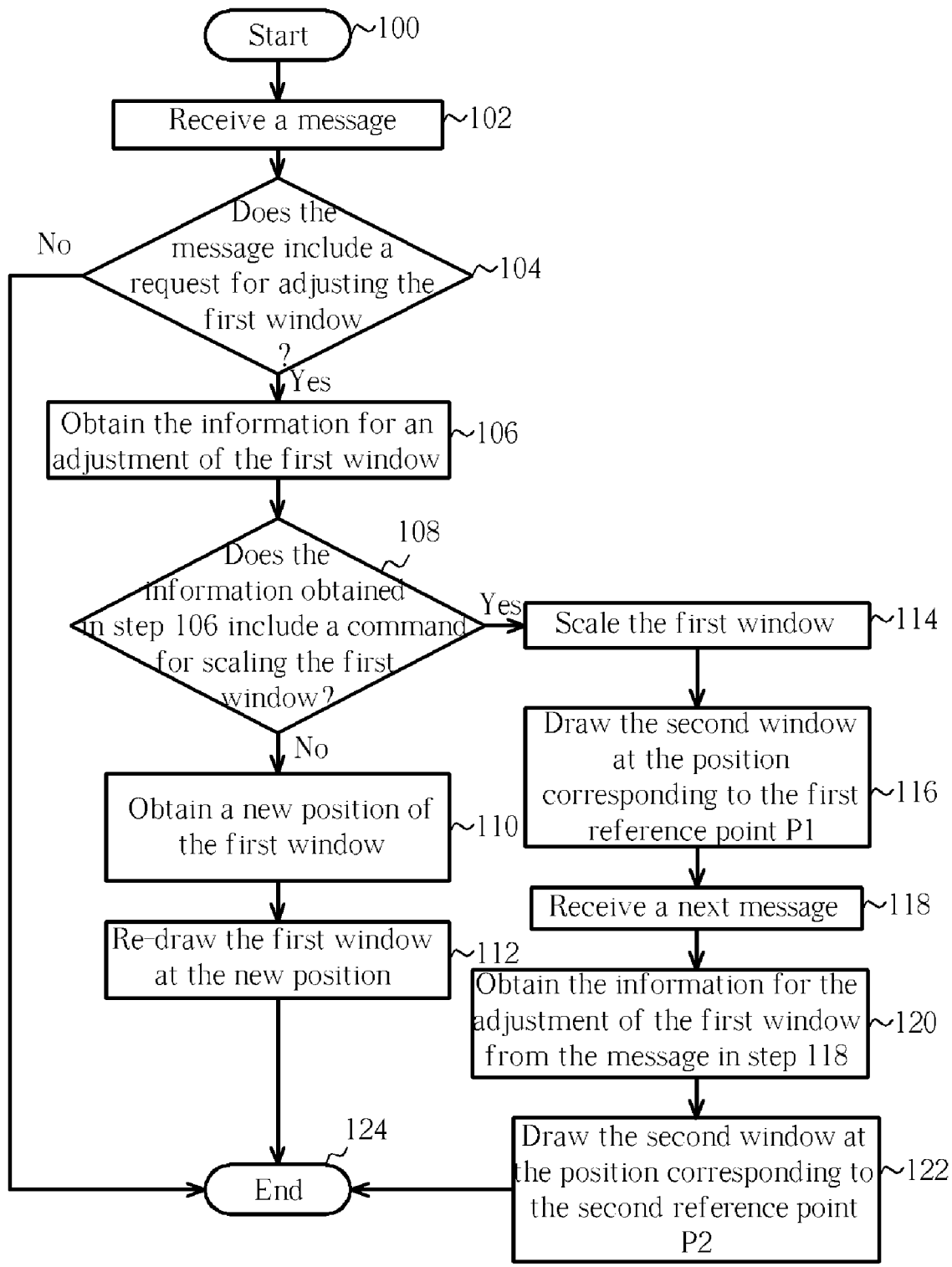
FIG. 3 is a flowchart of adjusting the first window according to the prior art.
Figure 4:
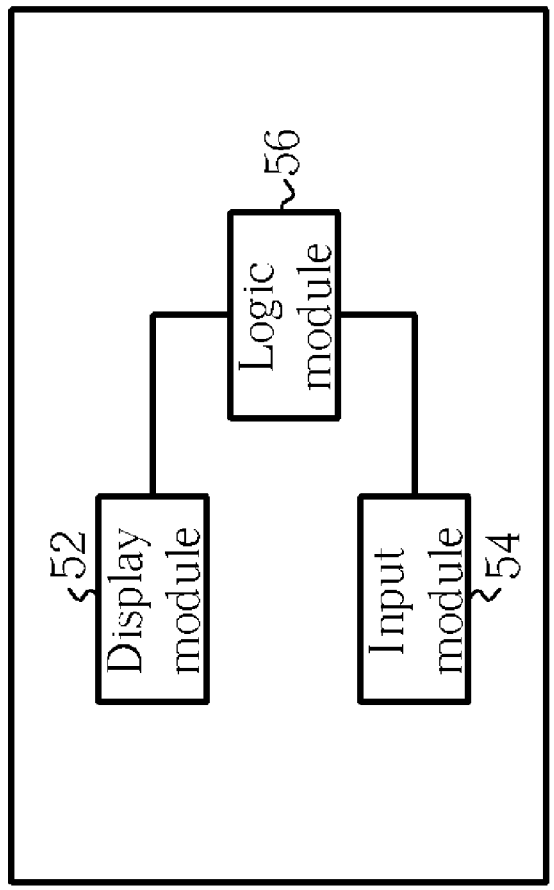
FIG. 4 is a diagram of an electronic device according to the present invention.

Please refer to FIG. 4, which is a diagram of an electronic device 50 capable of displaying a resized window according to the present invention. The electronic device 50 can be a personal computer, a mobile phone or a personal digital assistant (PDA). The electronic device 50 comprises a display module 52, such as a liquid crystal display (LCD), for displaying windows; an input module 54, such as a mouse or a keyboard, for inputting a window-adjusting command to change the position of the window or scale the window; and a logic unit 56 for controlling the display module 52 to display the adjusted window after receiving the window-adjusting command from the input module 54.

Figure 5:
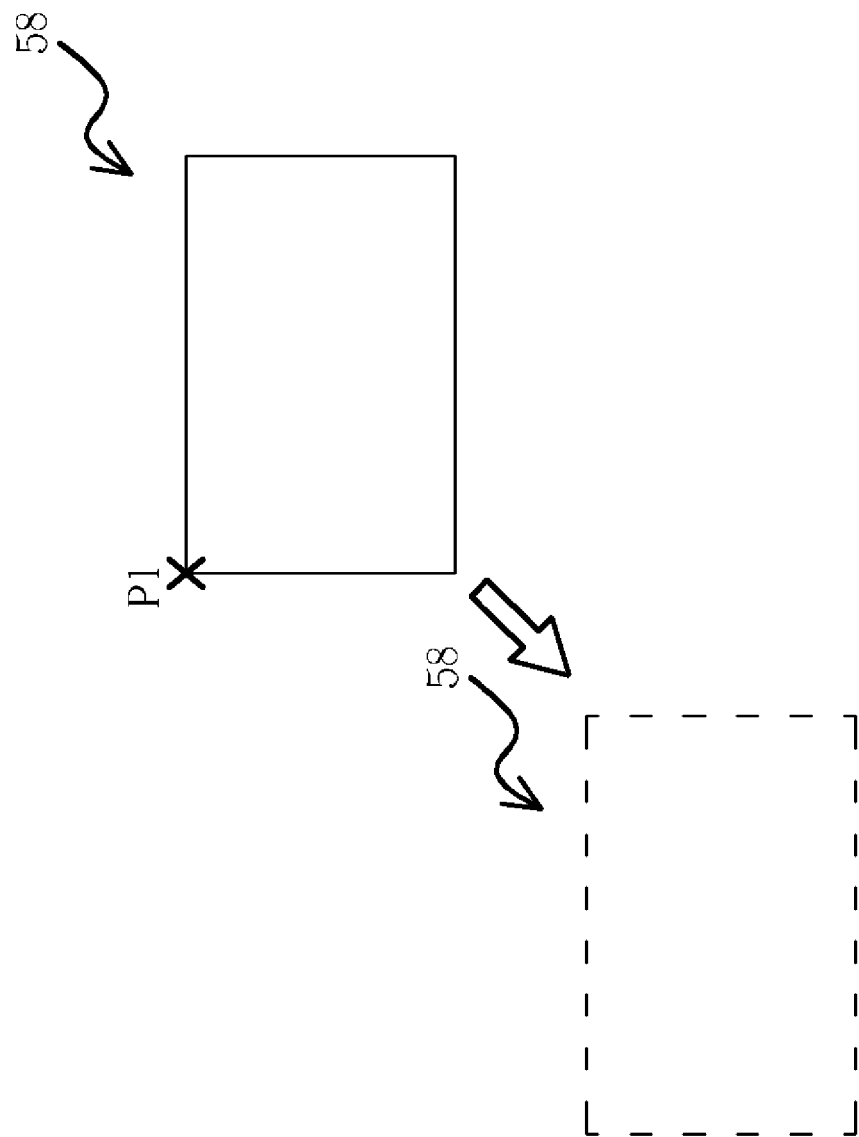
FIG. 5 is a diagram of moving a first window on a display module based on the present invention.
Figure 6:
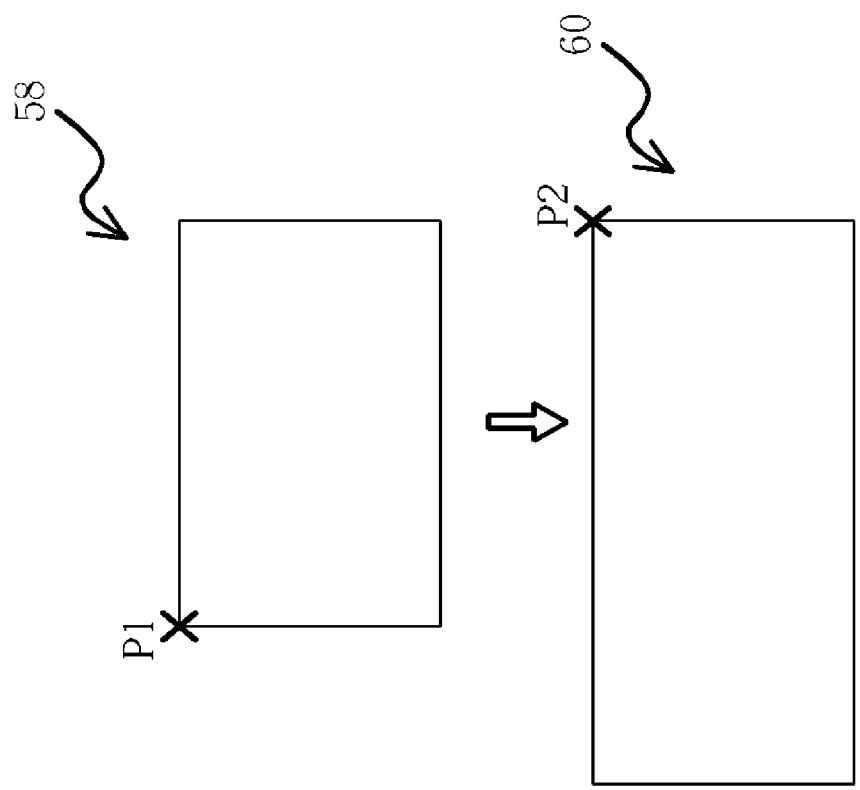
FIG. 6 is a diagram of scaling the first window to become a second window on the display module based on the present invention.
Figure 7:
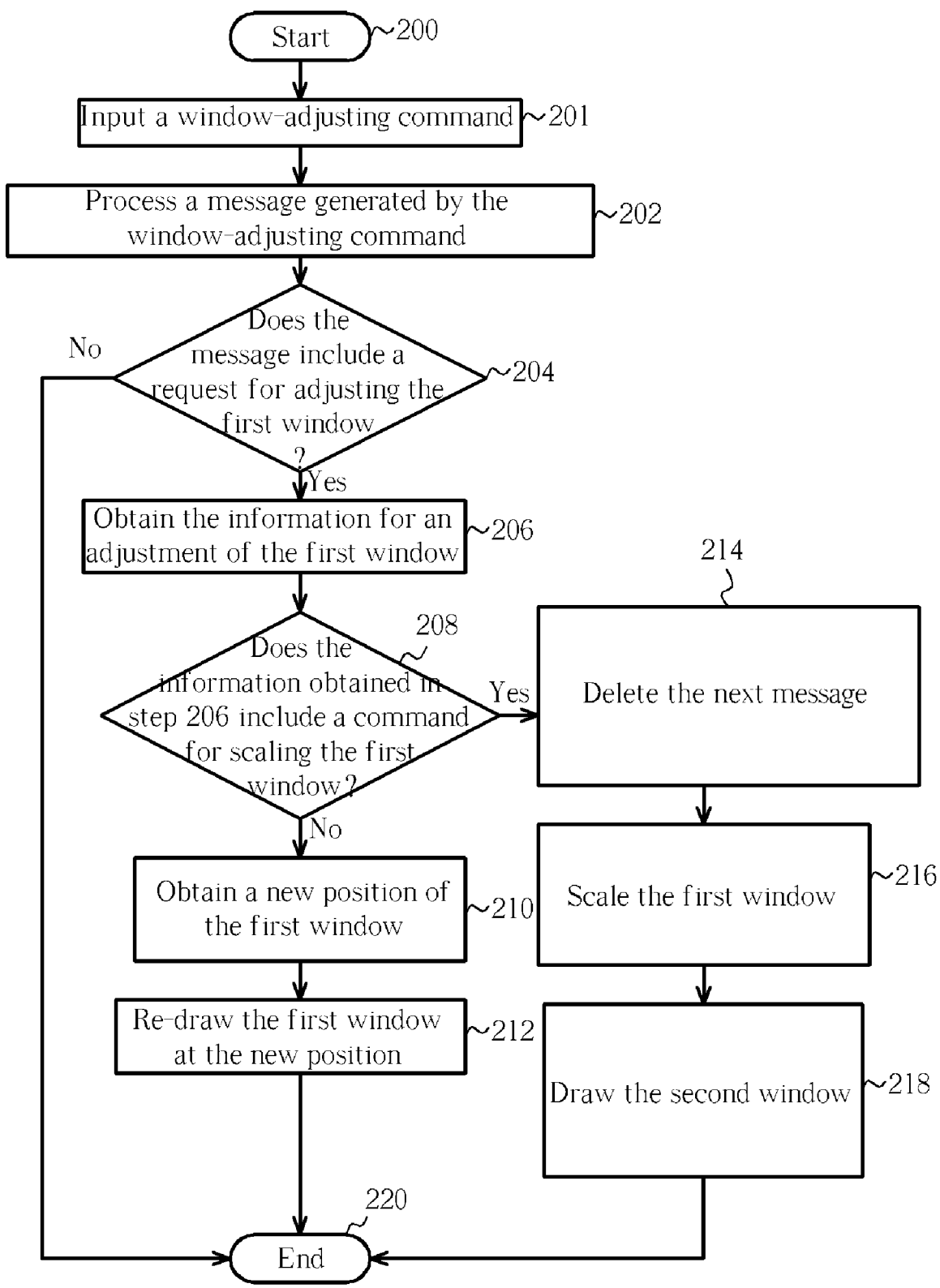
FIG. 7 is a flowchart of adjusting the first window according to the present invention.

Please refer to FIGS. 5 and 6. FIG. 5 is a diagram of moving a first window 58 on the display module 52 based on the present invention. FIG. 6 is a diagram of scaling the first window 58 into a second window 60 on the display module 52 based on the present invention. In FIG. 5, the first window has a first size, and is located at a position corresponding to a first reference point P1 before being moved or scaled. When the first window 58 is moved, the first window 58 is re-drawn at a new position (dashed line area), remaining at the same window size. In FIG. 6, the first window 58 is scaled into a second window 60 having a second size. The second window 60 is directly drawn according to the top-right point of the first window 58, taken as a second reference point P2, and is displayed at a position corresponding to the second reference point P2, which is different from the position corresponding to the first reference point P1. Please refer to FIG. 7, which is a flowchart of adjusting the first window 58 according to the present invention.

Step 200: Start.

Step 201: A window-adjusting command is input via the input module 54.

Step 202: The logic unit 56 processes a message (first message) received by a message queue after receiving the window-adjusting command input by the input module 54.

Step 204: Determine whether the message includes a request for adjusting the first window 58. If so, step 206 is entered. Otherwise, step 220 is entered.

Step 206: The information for an adjustment of the first window 58 is obtained from the message.

Step 208: Determine whether the information obtained from step 206 includes a command for scaling the first window 58. If so, step 214 is entered; otherwise, step 210 is entered.

Step 210: A new position of the first window 58 is obtained according to the information obtained in step 206.

Step 212: As shown in FIG. 5, the first window 58 is re-drawn at the new position so that the first window 58 is moved from the original position to the new position, and then step 220 is entered.

Step 214: According to a predetermined flag, the present invention does not execute a next message (second message). The second message includes moving the second window 60 from the position corresponding to the first reference point P1 to the position corresponding to the second reference point P2. In other words, the flag is used for deleting the next message.

Step 216: As shown in FIG. 6, the first window 58 having the first size is scaled to become the second window 60 having the second size according to the information obtained in step 206.

Step 218: As shown in FIG. 6, the second window 60 having the second size is directly drawn at the position corresponding to the second reference point P2 according to the information obtained in step 206.

Step 220: End.

First, the user inputs a window-adjusting command via the input module 54 to move or scale the window. For example, the user can use a mouse or a keyboard to move the window or scale its size. When the user wants to move the window, but not to scale its size, the operating system only generates a message for the window movement as the prior art does. However, when the user wants to scale the window, the operating system generates two messages for scaling. Steps 204 to 208 determine whether the message received by the message queue includes a request for adjusting the first window 58, and determine whether the command of adjusting the first window 58 indicates to move or to scale the first window 58. When the user moves the window, the operating system obtains the new position where the first window 58 is moved to according to the information obtained in step 206. Then, the first window 58 is re-drawn at the new position so that the first window 58 is moved from the original position to the new position.

When the user wants to scale the window as in steps 214 and 218, a flag is set in a corresponding program of the operating system to tell the operating system not to execute the moving request included in the next message. That is, the second window 62 is not moved from the position corresponding to the first reference point P1 to the position corresponding to the second reference point P2, indicated by the next message. In short, the flag is set to delete the next message, and therefore the moving request included in the next message is not executed. Next, according to the information in step 206, the first window 58 having the first size is scaled to become the second window 60 having the second size, and the second window 60 is directly drawn at the position corresponding to the second reference point P2. Therefore, the scaled window is displayed directly at the new position (the position corresponding to the second reference point P2). Since the flag is set, the next message, which requests to move the second window 60 from the position corresponding to the first reference point P1 to the position corresponding to the second reference point P2, is not executed.

In conclusion, when the user wants to scale the window, the prior art displays the scaled window at the original position (the position corresponding to the first reference point P1)

according to the first message, and then moves the scaled window to the new position (the position corresponding to the second reference point P2) according to the second message. However, in the present invention, the scaled window (second window 60) can be directly displayed at the new position (the position corresponding to the second reference point P2) instead. The present invention ignores the second message, and directly displays the scaled window at the new position during processing the first message. Therefore, when the user drags the window for scaling, window flicker does not occur.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for displaying a resized window on a display module as directed by a computing system running an operating system (OS) in which, in response to a request to scale the window, the OS issues a first signal for resizing the window and a second signal for moving the window, the method comprising:
   receiving the first signal to resize the window, wherein the window is located at a position corresponding to a first reference point;
   resizing the window from a first size to a second size according to the first signal, and wherein the first and second sizes are each smaller than an area of the display module;
   receiving the second signal for moving the window after the first signal for resizing the window;
   ignoring the second signal; and
   displaying the window having the second size at a position different from the position corresponding to the first reference point according to the first signal.

2. The method of claim 1, further comprising setting a flag for deleting the second signal.

3. The method of claim 1, further comprising setting a flag for ignoring the second signal.

4. An electronic device, comprising:
   a display module configured to display a window at a position corresponding to a first reference point at a first window size;
   an input module configured to cause an operating system (OS) to issue a first signal for resizing the window and a second signal for moving the window; and
   a logic unit configured to generate the window at a second window size according to the first signal and ignore the second signal;
   wherein the logic unit is configured to resize the window at a position different from the position corresponding to the first reference point according to the first signal.

5. The electronic device of claim 4 wherein the display module is a liquid crystal display (LCD).

6. The electronic device of claim 4 wherein the input module is a mouse.

7. The electronic device of claim 4 wherein the electronic device is a personal computer.

8. The electronic device of claim 4 wherein the electronic device is a mobile phone.

9. The electronic device of claim 4 wherein the electronic device is a personal digital assistant (PDA).

10. An electronic device, comprising:
    means for receiving via an input module a request for adjusting the window on the display, the request comprising (a) a first signal with instructions to scale the window from a first size to a second size, and (b) a second signal to move the window from a first position corresponding to a first reference point to a second position corresponding to a second reference point, wherein the signals are relayed by an operating system (OS) that, in response to the request for adjusting the window, issues the first and second signals;
    means for deleting the second signal; and
    means for displaying the window in the second size at the second position corresponding to the second reference point in response to the first signal.

11. The electronic device of claim 10 wherein the window has a first corner and a second corner, and wherein the first reference point corresponds to the first corner, and the second reference point corresponds to the second corner.

12. The electronic device of claim 10 wherein the first message and the second message are generated by the OS in response to receiving the request for adjusting the window on the display.

13. The electronic device of claim 10, further comprising:
    means for determining that the request includes a first message and a second message; and
    means for setting a flag for the second message, wherein the means for deleting the second message is configured to delete the second message in response to the flag.

14. The electronic device of claim 10 wherein the instructions to scale the window from a first size to a second size include the first reference point and the second reference point.

* * * * *